Feb. 9, 1965 S. G. TILDEN, SR., ETAL 3,169,017
BRAKE SHOE CLAMPING DEVICE
Filed Nov. 13, 1962 2 Sheets-Sheet 1
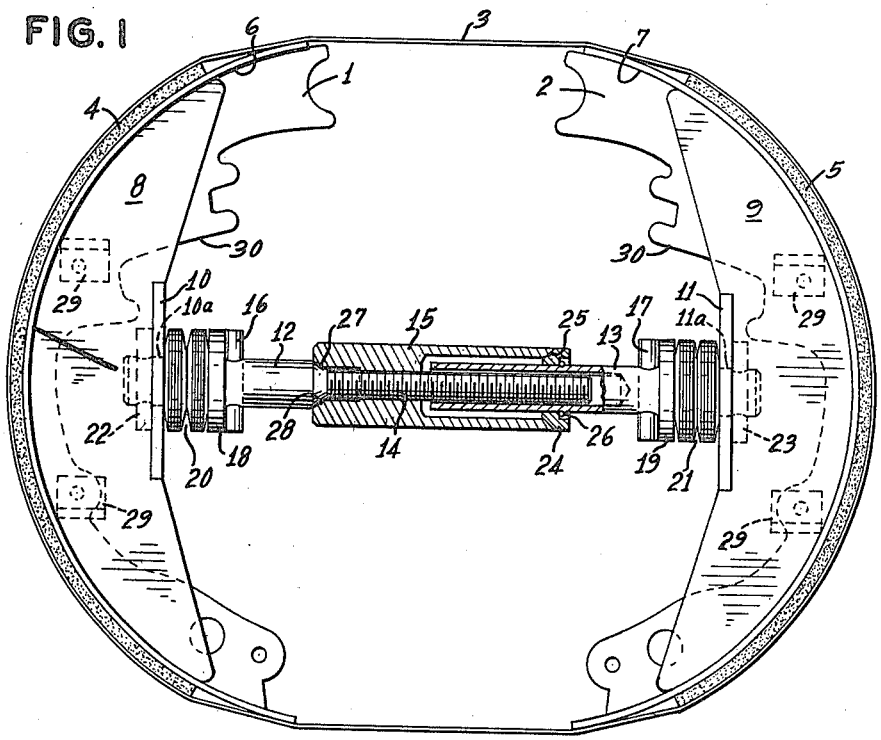
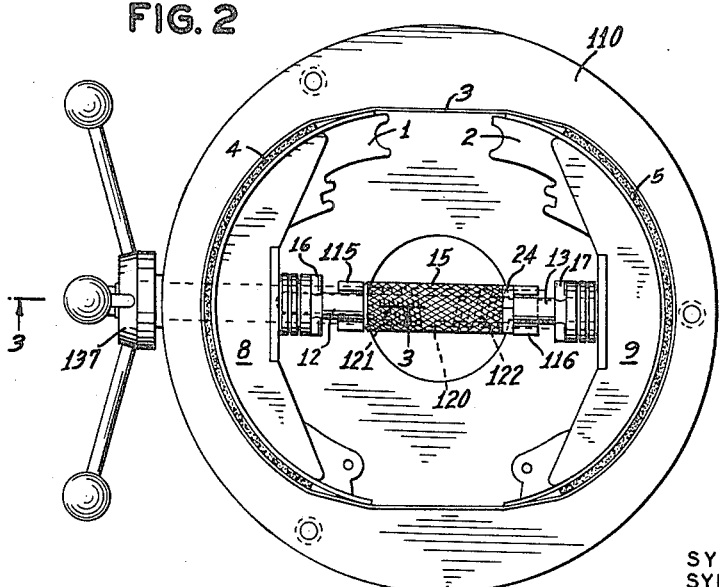
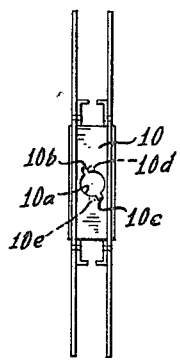
INVENTORS
SYDNEY G. TILDEN, SR.
SYDNEY G. TILDEN, JR.
BY
*James A. Eisenman*
ATTORNEY

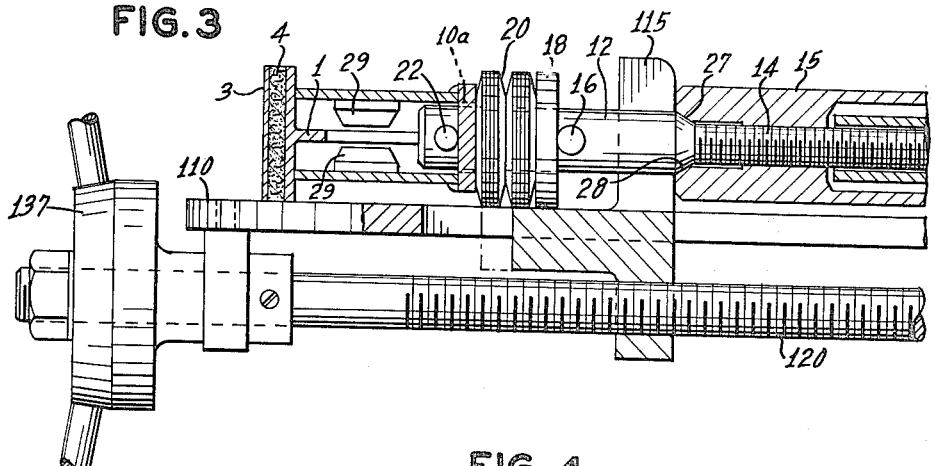
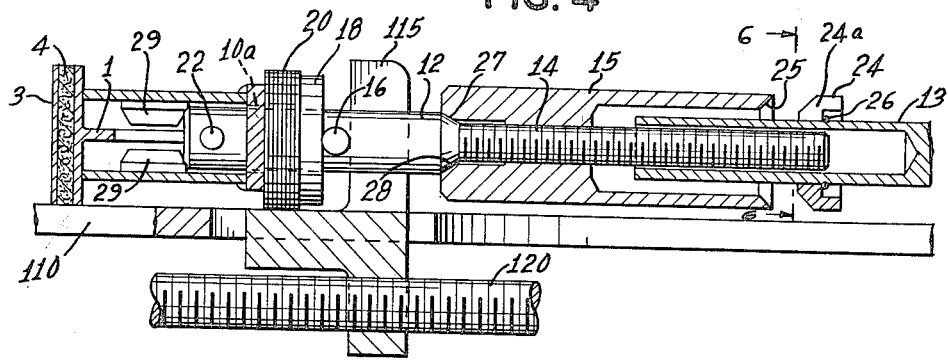
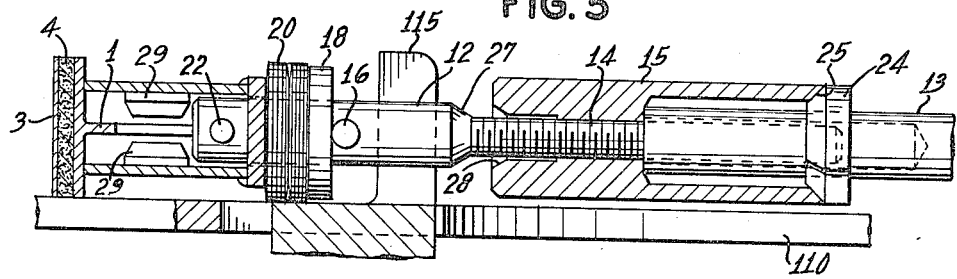
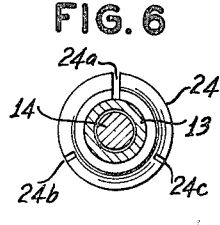
INVENTORS
SYDNEY G. TILDEN, SR.
SYDNEY G. TILDEN, JR.
ATTORNEY United States Patent Office 3,169,017
Patented Feb. 9, 1965

3,169,017
BRAKE SHOE CLAMPING DEVICE
Sydney G. Tilden, Sr., Glen Cove, and Sydney G. Tilden, Jr., Glen Head, N.Y., assignors to The Permafuse Corp., Westbury, N.Y., a corporation of New York
Filed Nov. 13, 1962, Ser. No. 236,851
4 Claims. (Cl. 269—153)

This invention relates to brake shoes such as are used in automobile brakes, and more particularly to improvements in apparatus for the production and repair of brake shoe assemblies wherein the friction material or brake lining is attached to the metallic brake shoe by means of a thermosetting adhesive. This type of brake shoe assembly is known to the trade as a "bonded brake shoe." In such a product, the adhesive is interposed between the friction material and brake shoe and the whole clamped together and cured under heat and pressure according to the adhesive cure specifications.

Clamping means for this purpose is disclosed in Patent No. 2,358,483, issued September 19, 1944, and has been in extensive use for many years.

As the demand for bonded brake shoes has increased, it has become necessary to design a clamping means which is faster to use, which requires less man power in turning the screw jack of the aforementioned patent, which does not tend to bend the brake shoe in the middle under the force exerted by the above-mentioned screw jack, which can be handled as a one-piece assembly and which incorporates a compressive spring means such as is disclosed in the above-cited patent by the spring 32 to provide some "follow up" in the clamping system as the thickness of the adhesive layer is reduced by flow at the time of cure.

The present invention has as its object to provide an improved clamping means which provides for exerting the clamping pressure to the entire underside of the brake lining platform of the brake shoe, thereby avoiding bending of the brake shoe when clamping; which, as an assembly, can be used to clamp opposing brake shoes within a flexible constraining band; and which utilizes a compression spring to maintain pressure between brake lining and brake shoe as the adhesive flows at the time of cure.

More particularly, this invention consists of an extendable member disposed between two arcuate pressure-applying members, hereinafter referred to as adaptors, which are shaped to fit the underside of two brake shoes set within an enclosing flexible but restraining metallic ring, compression spring means disposed between the extendable member and the arcuate adaptors and a conical wedge-like device to prevent rotating between the arcuate adaptors and the extendable member when the whole device is in the released position.

This invention consists further in certain features described hereinafter and an embodiment of the invention is shown in the accompanying drawings, and the invention itself will be claimed in the claims appended hereto.

In the accompanying drawings,

FIG. 1 is a plan view of a pair of brake shoes and linings assembled within a flexible ring and held therein under pressure by the jack and pressure plate adaptors, ready for placement in an oven to cure the adhesive;

FIG. 2 is a plan view showing the structure of FIG. 1 in place on an assembly table used in the operations of assembling and disassembling the brake shoes, adaptors and flexible ring before and after the adhesive curing operation;

FIG. 2A is a view in end elevation of a pressure plate adaptor showing a modified locking arrangement;

FIG. 3 is a sectional view in side elevation of a part of the structure of FIG. 2, with the assembly table set at its locked or jaws-retracted condition;

FIG. 4 is a sectional view similar to FIG. 3, with the assembly table set at its clamped or jaws-extended condition;

FIG. 5 is a sectional view similar to FIGS. 3 and 4, with the assembly table set with its jaws at an intermediate position, for insertion or removal of the brake shoe and adaptor assembly of FIG. 1; and FIG. 6 is a view in front elevation of a locking collar as viewed on the line 6—6 of FIG. 4 looking in the direction of the arrows.

Similar characters of reference indicate corresponding parts throughout the various views.

Referring to the drawings and more particularly to FIG. 1, brake shoes 1 and 2 are set opposite each other and encircled by a flexible steel band 3. Segments of friction material, 4 and 5, hereinafter referred to as brake lining segments, are interposed between the brake shoes 1 and 2 and the flexible steel band 3. A layer of thermosetting adhesive is interposed between the brake lining segments 4 and 5 and the brake shoes 1 and 2.

Contacting the brake shoes 1 and 2 at the inner surfaces of their flanges 6 and 7 are adaptor plates 8 and 9, having an outside radius which conforms to the inside radius of flanges 6 and 7. There are two adaptor plates on each side separated by pressure plates 10 and 11, each plate having a clearance hole 10a, 11a to slidingly accommodate screw jack ends 12 and 13. Screw jack end 12 has male threads upon its portion 14 to accommodate the female threads of nut 15, which in turn is counterbored to accommodate screw jack end 13. Pins 16 and 17 locate thrust washers 18 and 19 and compression springs hereinafter referred to as Belleville springs, i.e. 20 and 21 which are in contact with pressure plates 10 and 11. These are locked together with some initial compression by pins 22 and 23.

On screw jack end 13 is placed a conical locking collar 24, which is in contact with nut 15 on its conical surface 25. Locking collar 24 is positioned on screw jack end 13 by means of a lock ring 26 which fits in a groove on the screw jack end 13. As best seen in FIGURE 6 locking collar 24 is also cut through at 24a and provided with slots 24b and 24c to permit it to be collapsed upon screw jack end 13 when force is applied to its conical surface. Screw jack end 12 also has a conical surface 27 which fits conical surface 28 of nut 15. Guide clips 29 are attached to the inside surfaces of adaptor plates 8 and 9 to center the adaptors on the webs 30 of brake shoes 1 and 2.

The adaptor plates 8 and 9 have arcuate outer edge to conform to and to contact the brake shoes 1 and 2 at the inner surface of the brake lining support platforms or flanges 6 and 7. Since passenger car brake shoe design has been standardized to generally 9", 10", 11" and 12" brake drum sizes, all brake shoes will have generally the same brake lining platform surface radius for each size of brake drum and since generally the brake lining platform of the brake shoe is of the same thickness and since brake lining thicknesses have generally been standardized at $3/16$ inch, it is possible to calculate the radius of the adaptor plates 8 and 9 for each size brake drum, as follows:

$$R = \frac{D}{2} - (t_1 + t_2)$$

where
$R$=radius of arcuate adaptor
$D$=brake drum diameter
$t_1$=thickness of brake lining
$t_2$=thickness of brake shoe flange In order to relieve the operator of the physical effort of turning the screw jack of Patent No. 2,358,483, and also in order to establish a predetermined force of application, as assembly table of the type disclosed in Patent No. 2,695,649, issued November 30, 1949, may be used. Referring to FIGS. 2 and 4, the jaws 15 and 16 of Patent No. 2,695,649 (indicated herein by reference characters 115 and 116 respectively) contact the pins 16 and 17 of the present invention when a force on the adaptors 8 and 9 is being exerted, and in the completely retracted position, as shown in FIGS. 2 and 3, contact the screw jack nut 15 and the conical locking collar 24. As inward pressure on these parts is being exerted, the conical locking collar 24 tends to collapse on the screw jack end 13 and wedges the jack end 13 in relation to the nut 15 to prevent rotation between the two. The engagement of conical surfaces 27 and 28 under pressure prevents relative rotation between the nut 15 and screw jack end 12. Thus the assembly is held in a rigid position when the assembly plate jaws are in the fully retracted position, permitting ready disassembly of the brake shoes while the clamping device is held in position to receive the next set of brake shoes.

As shown in FIG. 2, the assembly including the screw jack, adaptor plates, brake shoes and brake lining segments with adhesive interposed, and flexible steel band, is placed upon an assembly table of the type described in Patent No. 2,695,649. Jaws 115 and 116 are in contact with pins 16 and 17 when expanded, and are in contact with nut 15 and locking collar 24 when contracted. Jaws 115 and 116 are slidable in guide slots in the assembly base plate 110, and are provided with threaded extensions below the guide slots engaging oppositely threaded portions 121 and 122 of a lead screw 120. Screw 120 is rotated by means of hand wheel 137.

In operation, the screw jack assembly is placed between the jaws of the assembly table as shown in FIG. 2, and the jaws 115 and 116 retracted by counter-rotating the screw 120 by means of hand wheel 137. The inner surfaces of jaws 115 and 116 will then contact the end surface of nut 15 and the end surface of conical locking collar 24. As contracting pressure is applied by continued counter-rotation of the hand wheel 137, locking collar 24 is forced against the conical surface of nut 15 and grips the outside surface of screw jack end 13, thus locking the two together and preventing rotation of one with respect to the other.

The adaptor assembly, being thus locked in position on the assembly plate, the brake shoes may be inserted into the adaptor plate assemblies, the brake lining segments 4 and 5 with adhesive already applied are set in place against the outer surfaces of the brake shoes 1 and 2, and the flexible steel encircling band 3 set in place around the whole. Then, by rotation of the screw 120 by means of hand wheel 137, the jaws 115 and 116 are expanded as shown in FIG. 4, forcing the brake shoes 1 and 2, and brake lining segments 4 and 5, against the encircling flexible steel band, causing pressure on the adhesive layer.

When sufficient pressure has been exerted as determined by the torque limiting means of the device as disclosed in Patent No. 2,695,649, the nut 15 is rotated to take up the slack after which the jaws 115 and 116 may be partially retracted as shown in FIG. 5 by counter-rotation of the hand wheel 137, thus releasing the clamped assembly from the assembly plate. The clamped assembly may then be placed in an oven of some sort and subject to a time-temperature heating cycle for proper cure of the adhesive.

Anticipating a continuous production cycle, the assembly table, having been emptied of the clamped brake shoe assembly, is now ready to receive a completely bonded set of brake shoes still clamped together in a similar screw jack assembly, for disassembly. The clamped assembly is set in place on the assembly table between the jaws 115 and 116 and the jaws expanded by rotation of the hand wheel 137 to the limit of the torque limiting device, after which the nut 15 is counter-rotated until the nut 15 bottoms on screw jack end 12 at their mating conical portions 27 and 28, thus locking nut 15 to screw 12. By counter-rotation of the hand wheel 137 the jaws are retracted until the inside surfaces of the jaws 115 and 116 are forced inwardly against the nut 15 and the end surface of conical locking collar 24 and pressure on these parts is continued by counter-rotation of the hand wheel 137 up to the limiting capacity of the torque limiting device. When the steel band and shoes 1 and 2 are removed from the clamping device after bonding, the adaptor plates 8 and 9 will remain parallel to the assembly base plate 110, ready and positioned to receive the next set of brake shoes.

One important feature of the present invention is that the pressure exerted by jaws 115 and 116 in the assembly operation is against pins 16 and 17, then through thrust washers 18 and 19 upon the Belleville springs 20 and 21, collapsing the springs in proportion to the force exerted by the jaws 115 and 116. Thus, when by rotation of the nut 15 on screw jack threaded portion 14 the slack has been taken up and by counter-rotation of the hand wheel 137 the jaws 115 and 116 have been retracted, the assembly may be removed from the assembly table with the Belleville springs 20 and 21 still in compression and exerting a continuing force through the pressure plates 10 and 11 to the adaptor plates 8 and 9, and the brake shoes 1 and 2.

When the clamped assembly as shown in FIG. 1 is placed in an oven to cure and set the thermosetting adhesive, there will be some loss in the thickness of the adhesive layer due to the loss of volatile material in the adhesive and also to the flow of the adhesive as it softens during cure. When such loss of thickness occurs, the Belleville springs 20 and 21, under compression, expand to take up the loss and maintain pressure at the adhesive layer.

Another important feature of the present invention is that the adaptor plate ends are readily interchangable to accommodate various brake shoe sizes. If the clamp assembly is set up with adaptor plate ends for a 12" brake diameter, it will fit only brake shoes of that diameter. Thus to be used with brake shoes of another diameter, say 9", the 12" diameter plate ends can be readily removed and 9" diameter plate ends substituted. To accomplish this, it is only necessary to compress the Belleville springs 20 and 21, in a simple fixture, enough to relieve the pressure from pins 22 and 23 which can then be knocked out, the adaptor plate assembly of the proper size substituted and the pins 22 and 23 replaced. If desired a modified releasable locking arrangement may be used for securing the plate ends to the jack. Referring to FIGURE 2A, the opening 10a of pressure plate 10 can be formed with extension slots 10b and 10c inclined to the longitudinal axis of the plate end to form a bayonet-type lock for a correspondingly shaped pin (not shown) on the jack ends. Detents 10d and 10e can be provided to align the parts.

Although the operation of the invention has been described in connection with the hand wheel operated assembly table of Patent No. 2,695,649, it will be evident without illustration that a power operated table using hydraulic or compressed air devices, for example, may be used for actuating the jaws 115 and 116 or equivalent means.

We claim:
1. A fixture for clamping a pair of curved brake shoes and brake lining material within an enclosing flexible restraining ring, comprising a pair of oppositely disposed externally curved pressure-applying members having an outside radius adapted to engage the inside radius of said brake shoes substantially throughout the arcuate length thereof and means for resiliently urging said pressure- applying members outwardly away from each other to maintain a substantially constant compressive force between said brake shoes and their associated linings, each pressure-applying member comprising a pair of spaced-apart parallel plates, and a transverse pressure plate joining and supporting the pair of plates, said means for resiliently urging the pressure-applying members outwardly comprising compression spring means engaging the pressure plate.

2. A pressure-maintaining spacer device for use in the method of bonding friction material to automobile brake shoes wherein a pair of brake shoes are assembled with friction material and an interposed layer of thermosetting cement and held within a restraining member under compression by pressure-applying members that abut the inner curved surfaces of said shoes and are initially forced outward against said surfaces by an assembly device, said pressure-maintaining spacer device being adapted to maintain said pressure-applying members forced outward after the assembly has been removed from the assembly device, said pressure-maintaining spacer device including a screw jack having relative rotatable portions and disposed between said pressure-applying members, compression spring means disposed between the said screw jack and said pressure-applying members and a locking collar having portions to engage the relatively movable portions of said screw jack and responsive to axial pressure for preventing relative rotation between the parts of said screw jack when said brake shoes are removed from said pressure-applying members.

3. A pressure-applying device for use in the method of bonding friction material to automobile brake shoes wherein a pair of brake shoes are assembled with segments of friction material and an interposed layer of thermosetting cement and held within a flexible restraining ring under compression during curing of said cement, said pressure-applying device comprising two pairs of crescent-shaped plates having outer edges adapted to engage the inner curved surface of said brake shoes, and a pressure-receiving member secured to said plates at the inner edges thereof, said pressure-receiving member maintaining said plates in spaced superposed parallel relationship, the space between said plates providing clearance for the web member of a brake shoe, and pressure-maintaining spacer means extending between said pressure receiving members and compression spring means disposed between the said pressure-maintaining spacer means and said pressure receiving members.

4. The invention as set forth in claim 3, including detachable coupling means between the pressure-receiving members and the pressure-maintaining spacer means.

References Cited by the Examiner
UNITED STATES PATENTS

| | | | |
|---|---|---|---|
| 2,358,483 | 9/44 | Tilden | 269—153 |
| 2,498,937 | 2/50 | Barrett | 269—153 |
| 2,695,649 | 11/54 | Tilden | 269—153 |
| 2,759,516 | 8/56 | Bigelow | 269—132 |
| 2,899,995 | 8/59 | Lampe | 269—224 XR |

ROBERT C. RIORDON, *Primary Examiner.*
BROUGHTON G. DURHAM, *Examiner.*